United States Patent [19]

Groult et al.

[11] 4,317,789

[45] Mar. 2, 1982

[54] METHOD OF MAKING THIN POROUS STRIPS FOR FUEL CELL ELECTRODES

[75] Inventors: Pierre Groult, Etrechy; Danielle Civier, Longpont sur Orge; Jacques Prehaut, Brie Comte Robert, all of France

[73] Assignee: Societe Generale de Constructions Electriques et Mechaniques "Alsthom et Cie", Paris, France

[21] Appl. No.: 196,681

[22] Filed: Oct. 14, 1980

[30] Foreign Application Priority Data

Oct. 18, 1979 [FR] France .................. 79 25877

[51] Int. Cl.³ .................................. C04B 35/00
[52] U.S. Cl. ...................... 264/105; 264/113; 264/115; 264/122; 264/127
[58] Field of Search ............... 264/105, 113, 115, 122, 264/127

[56] References Cited

U.S. PATENT DOCUMENTS

| | | | |
|---|---|---|---|
| 3,197,527 | 7/1965 | Kyummeich | 264/105 |
| 3,496,063 | 2/1970 | Benning | 264/105 |
| 4,161,063 | 7/1979 | Goebel | 264/105 |

*Primary Examiner*—James R. Hall
*Attorney, Agent, or Firm*—Kenyon & Kenyon

[57] ABSTRACT

A method of continuously manufacturing strips which include at least one thin porous conductive layer, said strips being intended in particular to form electrodes for fuel cells, in which method one stage in the manufacture of said layer includes passing powdered material to form it between the rolls of a calender. The method, said material is prepared by mixing an aqueous dispersion of carbon powder, which is possibly coated with a catalyst, with an emulsion of binder; precipitating the binder on the powder; drying and dry crushing the precipitate then wetting the powder while crushing is continued, with a liquid intended to prevent the grains from adhering to the rolls of the calender while lubricating said grains material thus obtained, being free from any pore-forming product, is calendered without using any support.

17 Claims, No Drawings

METHOD OF MAKING THIN POROUS STRIPS FOR FUEL CELL ELECTRODES

BACKGROUND OF THE INVENTION

The present invention relates to a method of continuously manufacturing thin porous conductive strips by a calendering technique.

It also relates to the product obtained using the method and in particular to the use of the product as an electrode for a fuel cell.

The invention aims to produce continuous porous strips at an industrial rate, which strips may include a plurality of thin layers from about a few microns to a few hundreds of microns thick simply by using a calender and feeding powdered materials into it.

The invention also aims to produce thin homogeneous layers of uniform porosity in which there are no fractures and which are self supporting.

Proposals have already been made to produce strips by calendering powdered material based on carbon powder or on a metal powder with a binder.

However, in most cases, it is necessary to associate a support such as a mesh or a fabric with these materials, the mesh or fabric being embedded after calendering in the layer formed; this causes anisotropy, which may be detrimental to the uses envisaged.

Further, the powdered material is generally conveyed by a conveyor belt which also passes through the calender due to the fact that in general, the layer formed is not self supporting. Such a layer must then undergo heat treatment so as to consolidate it.

In the majority of cases, unless particular precautions are taken requiring the use of complex apparatus for feeding the calender, there occurs a binding phenomenon which results from the mutual adherence of the grains during calendering, which adherence prevents the calender from being fed uniformly and results in lack of homogeneity in the layer produced.

Lastly, this manufacturing method generally entails the use of pore-forming products in the powdered material for obtaining suitable porosity, and the removal of said pore-forming products after calendering may be detrimental to the uses envisaged.

Preferred applications of the present invention make it possible to mitigate the disadvantages described hereinabove.

SUMMARY OF THE INVENTION

The invention provides a method of continuously manufacturing strips using a calender, the strips including at least one thin, porous, conductive layer and being suitable for forming the electrodes of fuel cells, the method comprising:

mixing an aqueous dispersion of carbon powder with an emulsion of binder;
precipitating the binder onto the powder;
drying, and then crushing the precipitate; and
while still crushing the precipitate, wetting it with a liquid suitable for lubricating the precipitate and preventing grains of the precipitate from adhering to the rolls of the calender, whereby a wetted powder is obtained which is free from any pore-forming product and is capable of being calendered without a support;
said wetted powder being finally passed through the calender, without a support, to obtain a continuous strip.

The lack of a pore-forming substance and the fact that a support is not used during calendering make it possible to obtain a very homogeneous thin layer which is free from fractures.

Advantageously, to cause homogeneous precipitation of the binder on the carbon powder, both the aqueous dispersion and the binder emulsion are very diluted to obtain as homogeneous a mixture as possible of these two ingredients before precipitation.

Thus, the aqueous dispersion of carbon powder may include 10 to 50 g/l of carbon according to the kind of carbon used, the carbon being optionally coated with a catalyst such as platinum, for example. Both carbon black and active carbon can be used.

After dispersion, a degassing operation should be carried out so as to remove any air bubbles from the surface of the carbon grains.

DETAILED DESCRIPTION

A polytetrafluoroethylene binder in an emulsion which includes about 100 to 120 g of dry extract per liter is preferably used. Said emulsion may be formed by diluting a more concentrated emulsion which may contain e.g. 400 to 600 g of polytetrafluoroethylene per kilogram of emulsion.

The binder emulsion may contain stabilizing agents which are then removed after the precipitation process by simply washing in water.

The carbon dispersion is mixed with the binder emulsion at a controlled temperature of less than 18° C., preferably between 12° and 15° C. so as to avoid spontaneous precipitation. Likewise, with this aim in view, the pH of the dispersion and of the emulsion are balanced before mixing.

Precipitation is then started either by raising the temperature, e.g. to about 25° to 30° C., or by adding cations, e.g. by adding dilute hydrochloric acid.

After precipitation (and possible washing in water if stabilizing agents have been added to the emulsion), the mixture is dried and then dry crushed, preferably in a knife crusher.

After a crushing period and while crushing continues, the mixture is wetted with a liquid intended to prevent the grains from adhering to the rolls of the calender, while lubricating the grains.

The liquid is chosen from the group which includes cyclohexanone, tetralin, decalin, and white spirit.

Thus, a white spirit can be used whose boiling point lies between about 140° and 160° C.

By way of example, the mixture can be wetted using 15 to 20 cc of liquid for 30 to 50 g of solid product.

After this operation, the powdered product is placed in a hopper which feeds the calender directly without using a supporting substrate. After calendering at ambient temperature, a porous, self-supporting conductive strip is thereby produced.

The binder can also be constituted by polyvinyl chloride, but in that case, cyclohexanone must not be used as a wetting liquid since it dissolves polyvinyl chloride.

A predetermined porosity is imparted to the thin layer by adjusting in particular the discharge of powder into the calender and the rotation speed of the calender rolls.

The thickness of the strip can be adjusted simply by adjusting the distance between the calender rolls.

Practically, thicknesses from a few microns to a few hundreds of microns can be obtained.

The method of the invention allows thin porous multilayer strips to be produced by cold calendering together several layers obtained according to the above-described method.

Continuous manufacture of a strip with two layers is possible, one layer being a barrier layer which includes carbon and a binder and the other layer being a catalytic layer which includes carbon coated with a catalyst and with a binder; the proportion by weight of binder in each layer, in particular polytetrafluoroethylene, may lie between 20 and 99%, with that of carbon lying between 80 and 1%.

EXAMPLE

A particular example of the invention is described by way of illustration. The description relates to the production of a two-layer electrode for use in a hydrogen-air fuel cell.

The electrode includes a barrier layer and a catalytic layer.

The barrier layer is conductive and provides electron transfer from the catalytic layer to the collector of the cell, while the permeability of the barrier layer to reagent gases (hydrogen or air) allow the catalytic layer to be reached by diffusion at a low feed pressure.

Further, due to the fact that it is hydrophobic, the barrier layer makes it possible to locate the liquid-gas interface within the active liquid.

The conductivity of the active or catalytic layer allows electron transfer from the reaction zones towards the collector via the barrier layer, with the porosity and the thickness of the active or catalytic layer ensuring ion diffusion towards or away from the reaction zones as well as bringing in the reagents.

Of course, the active layer acts as a catalyst to the electro-chemical process.

Such layers are obtained as follows.

In a first instance, to prepare the catalytic layer, firstly, 120 g of carbon with 20% platinum are dispersed in 4.5 liters of twice distilled water while stirring and at a temperature of about 12° C., then the above suspension is carefully degassed.

Secondly, 487 g of a PTFE emulsion with 37% of dry extract, known in the trade as "Soreflon", are diluted in 3 liters of twice distilled water at a temperature of 12° to 15° C. "Soreflon" PTFE emulsion is sold by Produits Chimiques Ugine Kuhlmann, PCUK and is a dispersion of polytetrafluoroethylene particles in water, the average size of the particles being about 0.25 micron and their density being about 2.16 to 2.25.

Then, the catalyst dispersion is poured into the PTFE emulsion, at a temperature of less than 15° C. while continuously stirring to homogenize the mixture suitably while preventing the mixture from agglomerating. The binder is then precipitated by adding dilute hydrochloric acid, the precipitation time being about 10 minutes. The precipitate is filtered and dried in an oven at 80° C. for 10 hours. The dried precipitate is then crushed, and during crushing it is slightly wetted with a liquid such as cyclohexanone, tetralin, decalin, or white spirit.

The purpose of such a liquid is to prevent the grains from adhering to the rolls of the calender by lubricating the grains and thus counteracting the binding phenomenon which results in the mutual adherence of said grains. Further, such a liquid makes it possible to adjust final porosity between given limits.

In the case of polytetrafluoroethylene, cyclohexanone is advantageously used.

Thereafter, the powder thus wetted is fed into the calender to obtain a thin strip as previously described.

In a second step the barrier layer is prepared as described hereinafter.

90 g of "Vulcan XC72" carbon are dispersed in 2 liters of twice distilled water while stirring, then the suspension is degassed. "Vulcan XC72" carbon is manufactured by Cabot Company; the average particle diameter is about 30.10 microns; the specific surface area is 254 $m^2/gm$; oil absorption (DBP) is 178 $cm^3/100$ gm; and pH is 7.5. Also, an emulsion of 568 g of Soreflon in 2 liters of twice distilled water is prepared at a temperature of 12° to 15° C. The dispersion and the suspension are then mixed together as in the case of the catalytic layer.

A precipitate is then formed by raising the temperature above 26° C. for about 25 minutes.

The precipitate is dried in an oven at 80° C. for 24 hours and is then crushed and wetted as in the case of the catalytic layer.

Then, the powder thus obtained is in its turn fed into the calender and another thin strip is obtained.

The two strips thus obtained are calendered together so as to produce the two-layer electrode which is then dried and possibly heat-treated to modify its hydrophobic quality. The electrode thus prepared includes 30% of Vulcan XC 72 and 70% of PTFE for the barrier layer, and 40% of catalyst and 60% of PTFE for the catalytic layer.

Such two-layer electrodes can easily be integrated into filter-press type fuel cells e.g. of the type described in U.S. Pat. No. 4,002,493, for "A fuel cell structure and system, more particularly for a carbon fuel and atmospheric air." In such cells the current can be collected by means of collectors with points or lines of contact a few millimeters apart, e.g. by a corrugated bipolar collector. Generally, such a collector can be made by any conductive material; advantageously it can be formed by a sheet of plastic material that is impregnated with conductive fibres, in particular carbon fibres. The contact between the collector and the electrode is provided either by pressure or, preferably, by welding or by glueing with a conductive glue, preferably an epoxy resin impregnated with carbon.

Further, the Applicant was surprised to find that such a way of drawing current from electrodes such as those produced in accordance with the method of the invention which have a high proportion of PTFE allows current densities to be obtained which are of the order of 300 $mA/cm^2$ for hydrogen and 200 $mA/cm^2$ for air for relatively low over-voltages which, for example, do not exceed 200 millivolts.

The table below gives a summary of the physical characteristics of such electrodes.

| Thickness (micrometers) | | $\rho$/thickness (ohms) | average $\rho$ ohm . cm | Apparent density | Porosity % |
|---|---|---|---|---|---|
| Barrier layer | 180 | 50 | 0.9 | 1.25 | 42 |
| Active layer | 60 | 3200 | 1.9 | 1.36 | 43 |
| Electrode | 240 | 50 | 1.2 | — | |

We claim:

1. A method of making a porous strip for use in an electrode of a fuel cell, the method comprising:
   (a) mixing a balanced pH degassed aqueous dispersion of carbon powder with a balanced pH emulsion of a binder at a temperature below that at which spontaneous precipitation will occur;
   (b) precipitating the binder onto the carbon powder grains;
   (c) drying the precipitate of binder-coated carbon grains;
   (d) crushing the dried precipitate;
   (e) wetting the precipitate before the completion of step (g) with a lubricating liquid to provide a wetted powder of binder-coated carbon grains moistened sufficiently to prevent adherence of the powder to the rolls of a calender;
   (f) feeding the wetted powder, without support, into a calender; and
   (g) calendering the wetted powder into a self-supporting thin porous strip.

2. The method of claim 1, wherein the aqueous carbon dispersion contains 10 to 50 grams of carbon per liter of water.

3. The method of claim 1, wherein said carbon powder dispersion includes a dispersed catalyst.

4. The method of claim 1, wherein the binder emulsion includes a stabilizing agent, the method further comprising washing the precipitate from step (b) in water to remove said stabilizing agent.

5. The method of claim 1, wherein the binder is polytetrafluoroethylene.

6. The method of claim 5, wherein the binder emulsion comprises 100 to 120 grams of dry extract per liter.

7. The method of claim 6, wherein step (a) comprises mixing the carbon dispersion and the binder emulsion at a temperature below 18° C.

8. The method of claim 7, wherein said mixing temperature is between 12° C. and 15° C.

9. The method of claim 7, wherein step (b) comprises raising the temperature of the mixture until precipitation starts to occur.

10. The method of claim 9, wherein said precipitating temperature is about 25° C. to 30° C.

11. The method of claim 7, wherein step (b) comprises adding dilute hydrochloric acid to the mixture provided in step (a) until precipitation occurs.

12. The method of claim 1, wherein the lubricating liquid of step (e) is selected from the group consisting of cyclohexanone, tetralin, decalin, and white spirit.

13. The method of claim 11, wherein step (e) comprises wetting the crushed precipitate with 15 to 20 cc of said lubricating liquid per 30 to 50 grams of solid precipitate.

14. The method of claim 17, wherein step (f) comprises adjusting the feed rate of wetted powder into the calender, and step (g) comprises adjusting the speed of the calender rolls to obtain a desired porosity of said thin strip.

15. The method of claim 1, 2, 4, 5, 6, 7, 8, 9, 10, 11, 12, or 13, further comprising:
   (h) repeating steps (a) through (g) to make an additional self-supporting thin porous strip, and
   (i) cold calendering said first-mentioned strip and said additional strip together to form a multi-layer strip.

16. The method of claim 14, wherein step (h) includes dispersing a catalyst with the carbon powder to form the aqueous dispersion, such that said first-mentioned strip forms a barrier layer of carbon coated with a binder, and said additional strip forms a catalytic layer of carbon coated with a catalyst and a binder.

17. The method of claim 15, wherein the binder for both layers is polytetrafluoroethylene, and its proportion by weight in each layer is between 20% and 99%.

* * * * *

UNITED STATES PATENT AND TRADEMARK OFFICE
CERTIFICATE OF CORRECTION

PATENT NO. : 4,317,789
DATED : March 2, 1982
INVENTOR(S) : Pierre Groult et al.

It is certified that error appears in the above—identified patent and that said Letters Patent is hereby corrected as shown below:

In the Abstract, line 14: after "grains" insert

--. The--.

*Signed and Sealed this*

*Fifteenth* Day of *June 1982*

[SEAL]

*Attest:*

GERALD J. MOSSINGHOFF

*Attesting Officer* — *Commissioner of Patents and Trademarks*